United States Patent [19]

Endo

[11] Patent Number: 5,668,935
[45] Date of Patent: Sep. 16, 1997

[54] CHARACTER OUTPUT DEVICE

[75] Inventor: Osamu Endo, Kanagawa, Japan

[73] Assignee: Fuji Xerox Co., Ltd., Tokyo, Japan

[21] Appl. No.: 683,425

[22] Filed: Jul. 18, 1996

[30] Foreign Application Priority Data

Jul. 19, 1995  [JP]  Japan .................................. 7-183130

[51] Int. Cl.⁶ .................................................. G06K 15/00
[52] U.S. Cl. ........................................... 395/110; 395/112
[58] Field of Search .............................. 395/101, 110, 395/112, 114, 115, 167, 168, 170, 805; 358/470; 382/177, 182; 345/143, 141, 195, 142; 400/61, 62, 67, 70, 83, 171, 172

[56] References Cited

U.S. PATENT DOCUMENTS

| | | | |
|---|---|---|---|
| 4,686,525 | 8/1987 | Nagata | 340/790 |
| 4,953,033 | 8/1990 | Sakamoto | 358/300 |
| 5,288,155 | 2/1994 | Suzuki | 400/83 |
| 5,410,640 | 4/1995 | Morikawa et al. | 395/110 |

FOREIGN PATENT DOCUMENTS

| | | |
|---|---|---|
| 60-80895 | 5/1985 | Japan . |
| 6-59851 | 3/1994 | Japan . |

*Primary Examiner*—Arthur G. Evans
*Attorney, Agent, or Firm*—Finnegan, Henderson, Farabow, Garrett & Dunner, L.L.P.

[57]  ABSTRACT

A character output device comprises a storage section for storing typeface property data consisting of quantitative and qualitative information of the specific parts of specific characters that are commonly possessed by a plural number of fonts, a distance calculating section for calculating a distance between typeface property of a font the use of which is requested and any of other fonts than the use requested font, and a font selector section for selecting, on the basis of the calculation result, a font of which the typeface property is closest to the typeface property of the use requested font. In the character output device, when a font with the same typeface as that of the use requested font is not retained in the character output device, a control section and a character development processor section cooperatively substitute the typeface of the retained font selected by the font selector section for the typeface of the use requested font to perform a character processing. An output section outputs the result of the character processing.

5 Claims, 4 Drawing Sheets

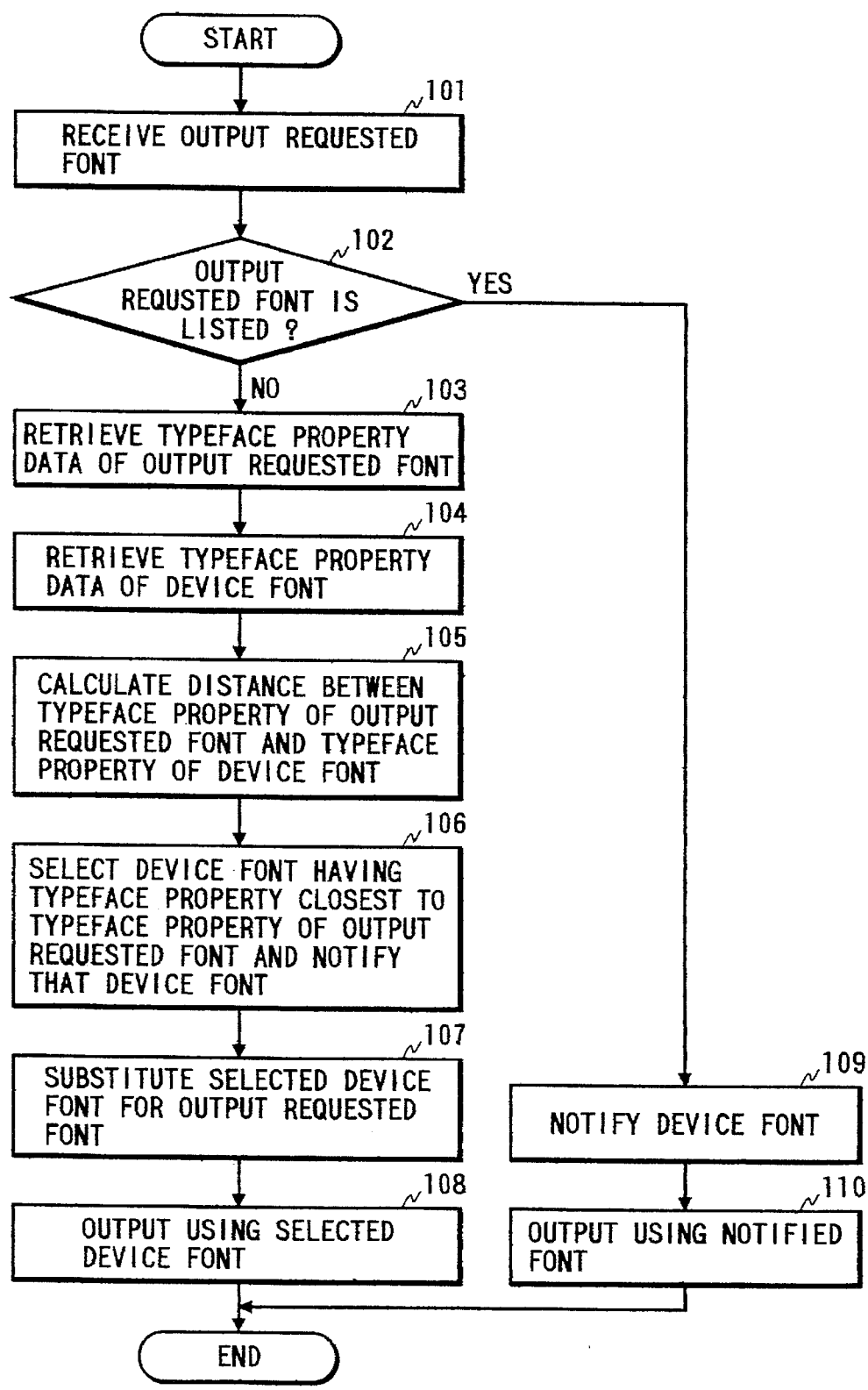

*FIG. 5*

| NAME OF TYPEFACE | CHARACTER WIDTH (a) | VERTICAL LINE WIDTH (b) | HORIZONTAL LINE WIDTH (c) | COUNTER (d) | PUTTING-OF-BRUSH (e) | SERIF (f) | SWEEP-UP (g) |
|---|---|---|---|---|---|---|---|
| MINCHO-LIGHT | 1000(a1) | 70(b1) | 30(c1) | 320(d1) | 1 | 1 | 1 |
| GOTHIC-MEDIUM | 1000(a2) | 100(b2) | 100(c2) | 240(d2) | 0 | 0 | 1 |
| MINCHO-MEDIUM | 1000(a0) | 120(b0) | 40(c0) | 270(d0) | 1 | 1 | 1 |

CHARACTER OUTPUT DEVICE

BACKGROUND OF THE INVENTION

1. Field of the Invention

The present invention relates to a character output device, such as a printer, which retains a plural number of fonts in advance and carries out a character output process. More particularly, the invention relates to a character output device which is able to automatically select the font closest to a font the use of which is requested, when the same font as the use requested font is not retained in the character output device.

2. Discussion of the Related Art

When a conventional character output device, such as a printer, outputs a character using a font that is not contained in the list of the fonts retained therein, it uses a previously designated font for outputting the character.

The use of the outline font succeeds in reducing the memory capacity of the storage for storing fonts in the character output device, and hence enables the device to retain a plural number of fonts.

When one of the fonts that are retained by the character output device (These fonts will be referred to as device fonts.) is requested for character outputting, a previously designated font, not closest in typeface to the use requested font, is used for outputting the character. Accordingly, the device fonts are inefficiently utilized. In other words, even if a font resembling the use requested font is contained in the list of the fonts of the character output device, the device is compelled to use the previously designated font. The result is the outputting of the character of the font quite different from the use requested font.

To solve the problem, a technique is disclosed in Japanese Patent Unexamined Publication No. Sho. 60-80895. In the technique, the properties of the use requested font are supplied to the character output device. The device selects the font the properties of which are closest to those of the use requested font, and outputs a character of the selected font.

In the publication, character set, typeface of character, character size, character inclination, and character thickness are used for the properties of the font used.

Another technique is disclosed in Japanese Patent Unexamined Publication No. Hei. 6-59851, and calculates differences between the values of specific properties of a use requested font and the values of specific properties of a device font, selects the font closest to the use requested font on the basis of the calculation results, and uses the selected font for character outputting.

In the publication, character thickness, character inclination, average character width, and the like, which define an external appearance of the character, are used for the properties of the font used.

In designating a typeface of character to be outputted from the character output device, a user usually designates it while referring to the typefaces of characters on the screen of the device on which he edited a document. In this case, the properties of the designated font are referred to and a font is selected on the basis of the reference on the character output device and processed for outputting.

The font designated on the device that the user used for editing is often not contained in the list of those fonts retained in the character output device. In this case, the properties of the designated font are referred to, and the font on the character output device, which is closest to the designated font, is selected.

It is not always to properly select a font close to the font intended by the user even if the properties of the font disclosed by Japanese Patent Unexamined Publication Nos. Sho. 60-80895 and Hei. 6-59851 are used.

As for the character thickness as one of the properties of the font, if the character thickness of the font, such as the bold face of the light face of the font, is known, the conventional art cannot know an exact value of the character thickness of the bold face. Accordingly, it is impossible to exactly grasp the typefaces of a bold face and another bold face.

For the line width of a character as one of the properties of the font, in some typefaces of characters, for example, the printed style, the line width varies during one stroke of writing. In such a style of character writing, the properties of the typeface per se, viz., the design features of the character, are difficult to qualitatively measure. If an average value, for example, of the line width is used instead, it often fails to exactly describe the design features of the character. Particularly, in the case of a style of character writing with a brush, the line width varies. The properties of that typeface is further difficult to express. Accordingly, it is impossible to exactly discriminate the likeness between the typefaces.

An imagery caused by a typeface design of a character frequently depends a form proper to a character. A character of which the counter is broad gives rise to a somewhat casual imagery, and a character with serifs gives rise to a solid imagery and hence is suitable for formal documents. The judgement based on only the properties of the character thickness, line width and the like fails to exactly discriminate the imagery difference.

SUMMARY OF THE INVENTION

Accordingly, an object of the present invention is to solve the above problems and to provide a character output device which exactly discriminates the typeface resemblance and the imagery difference on the typeface design, and selects the font closest to a font the use of which is requested.

In attaining the above object, the invention provides a character output device which selects a font with a desired typeface from among a plural number of fonts with different typefaces in response to a font-use request, and outputs a character using the selected font, comprising: storage means for storing quantitative information of specific parts of specific characters, which is information indicative of features of fonts, in the form of typeface property information in connection with the fonts; font select means for selecting a font with a typeface the use of which is requested when the font is coincident with any of the plural number of fonts, and a font of which the typeface property information stored in the storage means is closest to that of the use requested font when the use requested font is not included in the plural number of fonts; and character output means for outputting a character on the basis of the font selected by the font select means.

BRIEF DESCRIPTION OF THE DRAWINGS

FIG. 2 is a flow chart showing a procedure of a character output process by the character output device;

FIG. 5 is a table showing specific typeface property data.

DETAILED DESCRIPTION OF THE PREFERRED EMBODIMENT

The preferred embodiment of the present invention will be described with reference to the accompanying drawings.

Figure 1:
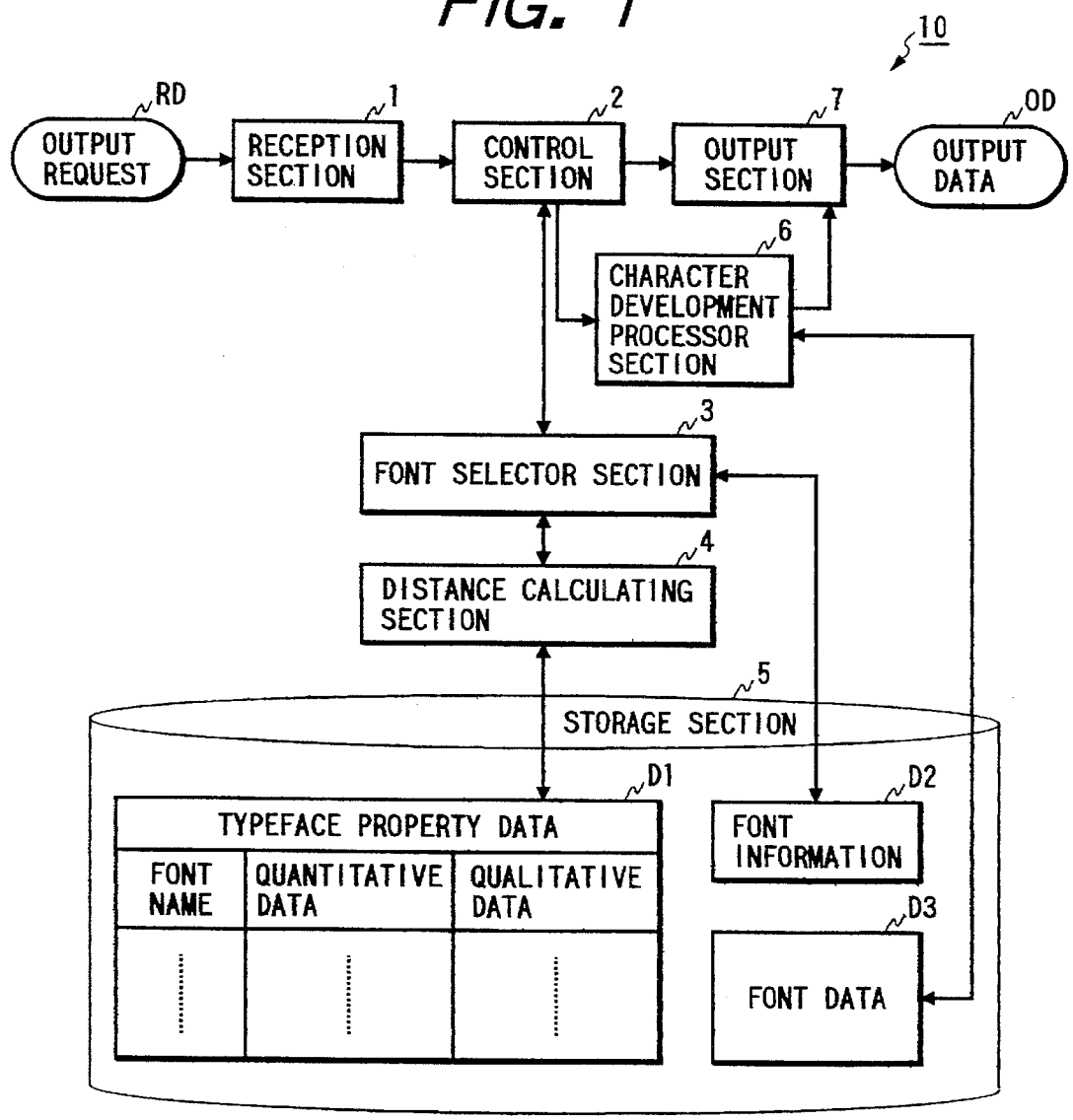
FIG. 1 is a block diagram showing an arrangement of a character output device according to an embodiment of the present invention.

FIG. 1 is a block diagram showing an arrangement of a character output device according to an embodiment of the present invention. In FIG. 1, a character output device 10 includes a storage section 5. The storage section 5 stores font data D3 of the fonts that the character output device 10 retains in advance (The fonts will be referred to as device fonts.), font information D2 as list information of device fonts, and typeface property data D1. The typeface property data D1 is typeface property data of the device fonts and the font the use of which is requested by the character output device 10, and is stored every font. The typeface property data D1 is also feature data of specific parts of specific characters that are commonly possessed by all the fonts. This type of the character will be referred to as a common character. The feature data consists of quantitative data and qualitative data, which are to be described later.

A reception section 1 is an interface for receiving an output request RD issued by, for example, a client device, not shown.

A control section 2 executes various controls to select the most suitable font on the basis of the output requested font received by the reception section 1.

A font selector section 3 receives the output requested font from the control section 2, and refers to the font information D2. If the output requested font is listed in the font information D2 or coincident with any of the device fonts, the font selector section 3 selects the output request font. If it is not listed, the font selector section 3 selects the fonts closest in shape to the output requested font from among the fonts listed, and sends the control section 2 that those selected fonts are usable.

A distance calculating section 4 responds to an instruction from the font selector section 3, and calculates a distance between the output requested font and the device font while referring to the typeface property data D1, and sends the calculation results to the font selector section 3.

A character development processor section 6 carries out a process for developing the output requested character into bit map data by using the device font receiving from the control section 2, and temporarily stores the bit map data therein.

An output section 7 receives an output instruction from the control section 2, takes output data of a predetermined data unit, e.g., one page, out of the character development processor section 6, carries out an output process, for example, a print output process, and outputs the result of the output process in the form of output data OD.

A procedure of the character output process carried out by the character output device 10 will be described with reference to a flow chart shown in FIG. 2.

In FIG. 2, the reception section 1 receives an output request RD and transfers it to the control section 2. When a request to use an output requested font is contained in the output request RD (step 101), the control section 2 transfers an instruction to select the output requested font to the font selector section 3. The font selector section 3 refers to the font information D2, and judges whether or not the same font as the output requested font is listed in the font information D2 (step 102).

If the output requested font is not listed (step 102), the font selector section 3 refers to the font information D2, and acquires the names of the listed fonts, viz., the device fonts. Then, it inputs the acquired names of the device fonts and the name of the output requested font to the distance calculating section 4. The distance calculating section 4 retrieves the typeface property data of the output requested font on the basis of the name of the output requested font (step 103), retrieves the typeface property data of the device font according to the names of the device fonts (step 104), and calculates a distance between the fonts on the basis of the value of each of the typeface property data pairs, each consisting of typeface property data of the output requested font and the typeface property data of each of the device fonts (step 105). When four device fonts, for example, are present, these fonts are combined with the output requested font to form four pairs of typeface property data, and these four pairs are distance calculated. The calculated distances in step 105 are each the Euclidean distance between the typeface properties, and as will subsequently be described, are properly weighted every typeface property into the synthetic distances modified by the balance and the relative weights of the values of the typeface property data.

The distance calculating section 4 outputs the distances calculated every pair of typeface property data in the step 105 to the font selector section 3. The font selector section 3 selects the typeface property data pair of the shortest distance from among those pairs, and sends the name of the device font of the selected pair to the control section 2 (step 106).

Thereafter, the control section 2 substitutes the received device font for the output requested font (step 107). The character development processor section 6 reads the font data D3 of the new or substituted font from the storage section 5, and develops the instructed character into bit map data. The bit map data is outputted as output data from the output section 7 (step 108).

On the other hand, if the font selector section 3 judges that the output requested font is contained in the list of the device fonts in step 102, the font selector section 3 notifies the control section 2 that the output requested font is contained in the list (step 109). The character development processor section 6, which received a character development instruction from the control section 2, reads the font data D3 of the output requested font from the storage section 5, and develops the instructed character into bit map data. The bit map data is outputted as output data from the output section 7 (step 110).

Next, the contents of typeface property data will be described.

As already stated, the typeface property data is the measuring values of the specific parts of specific characters that are commonly possessed by all the fonts, viz., common characters, and feature data of the characters. Therefore, it is possible to exactly discriminate the differences between the typefaces of characters by using the measuring values of the specific parts of the characters even if these are written with brush.

Figure 3A:
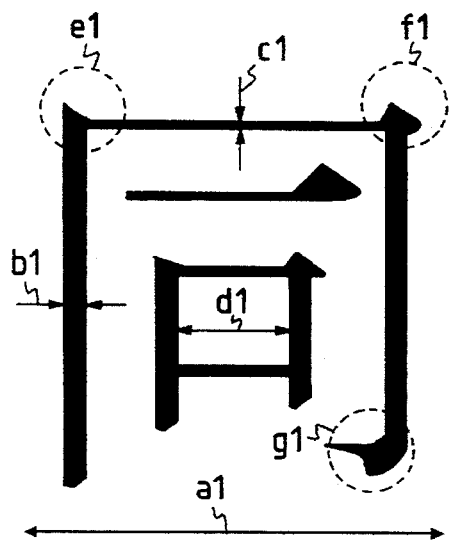
FIGS. 3(a) and 3(b) are diagrams exemplarily showing specific parts of characters from which typeface property data is gathered.
Figure 3B:
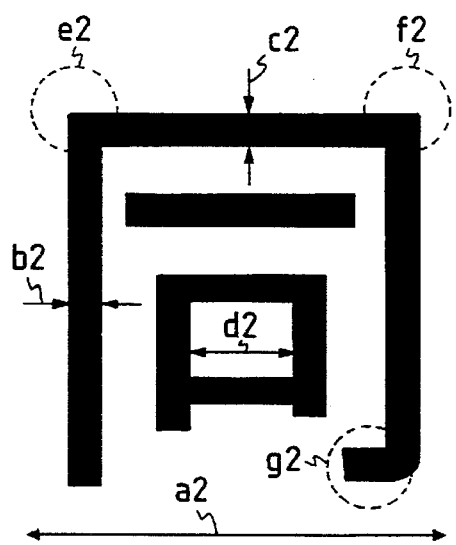

FIGS. 3(a) and 3(b) are diagrams exemplarily showing specific parts of characters from which typeface property data is gathered. FIG. 3(a) shows an output form of a Chinese character "同", the typeface of which is "Mincho-light". FIG. 3(b) shows an output form of the same Chinese character "同", the typeface of which is "Gothic-medium".

The typeface property data determines the common characters to be target characters for the typeface property data, or the characters from which the typeface property data is gathered. In this instance of the embodiment, the Chinese character "同" is used as one of the target characters. Of the common characters, some specific characters, such as a Chinese character "—", are improper to the proper target characters since these characters contain few parts that provide the property data useful in comparing the features of the typefaces.

In FIGS. 3(a) and 3(b), seven properties of the typeface are defined for the specific character "同". These properties are a character width a, a vertical line width b, a horizontal line width c, and counter d, a putting-of-brush e, a serif f, and a sweep-up g.

The character width a, vertical line width b, horizontal line width c, and counter d can be measured and provide quantitative data. The character width a is the width of the whole character. The vertical line width b is the width of the vertical line of the first stroke in writing the character "同". The horizontal line width c is the width of the horizontal line of the second stroke in writing the character "同". The counter d is the inside width of "口" of the character "同".

As shown in FIGS. 3(a) and 3(b), the vertical line width b and the horizontal line width c of the Mincho character are different in values from those of the Gothic character. In designing the Mincho character, the horizontal line width c is depicted narrower than the vertical line width b. In designing the Gothic character, those line widths are depicted substantially equal. In the case of the character "同", a state that an area enclosed by the first and second strokes or the portion of "口" is large, viz., broad, is described "The counter is broad." in the typeface design. A state that the same area is small, viz., narrow, is described "The counter is narrow.". In designing the typeface, a narrow "counter" tends to give rise to a solid image, and a broad "counter" tends to give rise to a soft image.

On the other hand, the properties of the putting-of-brush e, serif f, and sweep-up g are important, but it is difficult to quantitatively express these properties. Accordingly, the properties are expressed by data indicative of "presence/absence" of the property, viz., qualitative data.

Figure 4A:
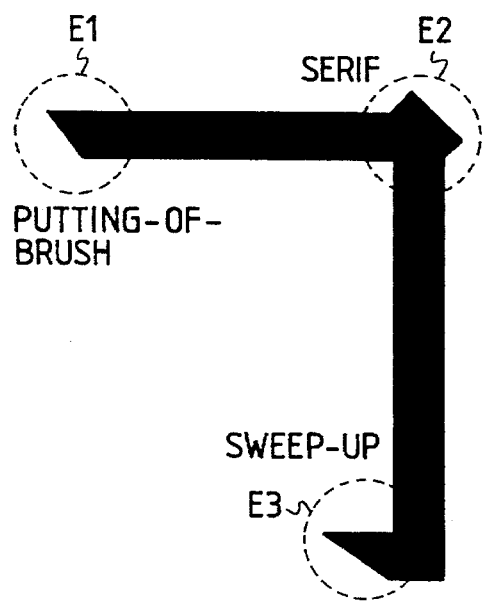
FIGS. 4(a) and 4(b) are diagrams showing the properties of a putting-of-brush a serif and a sweep-up.
Figure 4B:
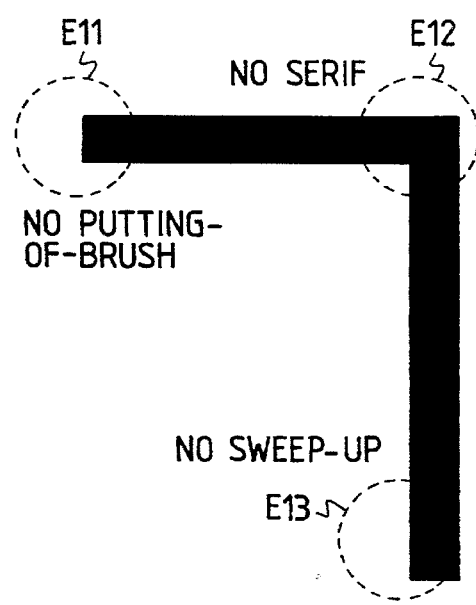

FIGS. 4(a) and 4(b) are diagrams showing the properties of the putting-of-brush e, serif f and sweep-up g. A typeface design of a putting-of-brush is found in an area E1 in FIG. 4(a), while it is not found in an area E11 in FIG. 4(b). In an area E2 in FIG. 4(a), a designed serif is found, while in an area E12 in FIG. 4(b), it is not found. In an area E3 in FIG. 4(a), a designed sweep-up is found, while in an area E13 in FIG. 4(b), it is not found.

In other words or straightforwardly, the "putting-of-brush" indicates a design of the head of a stroke of a brush, formed when the brush is put to paper. The "serif" indicates a design like a serif, formed when the brush motion is stopped midway in the brush stroke. The "sweep-up" indicates a design of the tail of the stroke, depicted when the brush is swept up.

The quantitative and qualitative typeface property data are stored in the storage section 5 in the form of typeface property data D1, every name of the font typeface.

FIG. 5 is a table showing specific typeface property data. As referred to above, the typeface property data D1 is stored in the storage section every name of the font typeface, in the form of the values of qualitative typeface properties (character width a, vertical line width b, horizontal line width c, and counter d), and presence/absence of the qualitative typeface properties (putting-of-brush e, serif f, and sweep-up g). In storing the qualitative typeface properties, the presence of the typeface property is stored as a value "1", and the absence of the typeface property, as a value "0".

Next, a distance calculation process that the distance calculating section 4 carries out using the typeface property data D1 shown in FIG. 5 will be describe. The name of the typeface of the output requested font is "Mincho-medium", and the names of the typefaces of two device fonts are "Mincho-light" and "Gothic-medium".

A mathematic expression of a distance D between the output requested font and the device font, which is used by the distance calculating section 4, will be described. The distance D is mathematically defined as follows:

$$D = \text{SQRT}(\alpha(a0-a')^2 + \beta(b0-b')^2 + \gamma(c0-c')^2 + \delta(d0-d')^2 + \epsilon(e0-e')^2 + \zeta(f0-f')^2 + \theta(g0-g')^2)$$

In the above equation, SQRT(X) indicates a square root of X, and "^" represents power. Greek characters $\alpha$ to $\theta$ represent weighting coefficients. a0 to d0 represent the values of the quantitative typeface properties of the output requested font, and the character width, the vertical line width, the horizontal line width, and the counter in this order. e0 to g0 represent the values of the qualitative typeface properties, and the putting-of-brush, the serif and the sweep-up in this order. a' to d' represent the values of the quantitative typeface properties of the device fonts as objects to be calculated, and the character width, the vertical line width, the horizontal line width, and the counter in this order. e' to g' represent the values of the quantitative typeface properties of the device fonts as objects to be calculated, and the putting-of-brush, the serif and the sweep-up in this order.

A distance D10 between the "Mincho-medium" of the output requested font and the "Mincho-light" of the device font is calculated in the following way:

$$\begin{aligned} D10 &= \text{SQRT}(\alpha(a0-a1)^2 + \beta(b0-b1)^2 + \gamma(c0-c1)^2 + \\ &\quad \delta(d0-d1)^2 + \epsilon(e0-e1)^2 + \zeta(f0-f1)^2 + \\ &\quad \theta(g0-g1)^2) \\ &= \text{SQRT}(10(1000-1000)^2 + 20(120-70)^2 + \\ &\quad 20(40-30)^2 + 10(270-320)^2 + 100(1-1)^2 + \\ &\quad 1600(1-1)^2 + 400(1-1)^2) \\ &= 277.49 \end{aligned}$$

In the above equation, $\alpha=10$, $\beta=20$, $\gamma=20$, $\delta=10$, $\epsilon=100$, $\zeta=1600$, and $\theta=400$.

A distance D20 between the "Mincho-medium" of the output requested font and the "Gothic-medium" of the device font is calculated in the following way:

$$\begin{aligned} D20 &= \text{SQRT}(\alpha(a0-a1)^2 + \beta(b0-b1)^2 + \gamma(c0-c1)^2 + \\ &\quad \delta(d0-d1)^2 + \epsilon(e0-e1)^2 + \zeta(f0-f1)^2 + \\ &\quad \theta(g0-g1)^2) \\ &= \text{SQRT}(10(1000-1000)^2 + 20(120-100)^2 + \\ &\quad 20(40-100)^2 + 10(270-240)^2 + 100(1-0)^2 + \\ &\quad 1600(1-0)^2 + 400(1-1)^2) \\ &= 301.16 \end{aligned}$$

The font selector section 3 receives the distance calculation results, and judges that the "Mincho-medium" of the output requested font is closer to the "Mincho-light" of the device font than to the "Gothic-medium" since the distance D10 is smaller than the distance D20, and selects the "Mincho-light" for the typeface. The control section 2 substitutes the "Mincho-medium" for the "Mincho-light", and controls the character output process.

A distance between the output requested font and the device font can be calculated using only the quantitative typeface properties, as a matter of course. The typeface of the device font close to the output requested font can be selected on the basis of the calculation results.

In this case, a distance D' between the output requested font and the device font is defined by the following equation.

$$D'=SQRT(\alpha(a0-a')^2+\beta(b0-b')^2+\gamma(c0-c')^2+\delta(d0-d')^2)$$

A distance D'10 between the "Mincho-light" of the output requested font and the "Mincho-light" of the device font is calculated in the following way, while using the weighting coefficients similar to those mentioned above:

$$\begin{aligned} D'10 &= SQRT\,(\alpha(a0-a1)\,2+\beta(b0-b1)\,2+ \\ &\quad \gamma(c0-c1)\,2+\delta(d0-d1)\,2) \\ &= SQRT\,(10(1000-1000)\,2+20(120-70)\,2+ \\ &\quad 20(40-30)\,2+10(270-320)\,2) \\ &= 277.49 \end{aligned}$$

On the other hand, a distance D'20 between the "Mincho-medium" of the output requested font and the "Gothic-medium" of the device font is calculated in the following way:

$$\begin{aligned} D'20 &= SQRT\,(\alpha(a0-a1)\,2+\beta(b0-b1)\,2+ \\ &\quad \gamma(c0-c1)\,2+\delta(d0-d1)\,2) \\ &= SQRT\,(10(1000-1000)\,2+20(120-100)\,2+ \\ &\quad 20(40-100)\,2+10(270-240)\,2) \\ &= 298.33 \end{aligned}$$

The font selector section 3 receives the distance calculation results, and judges that the "Mincho-medium" of the output requested font is closer to the "Mincho-light" of the device font than to the "Gothic-medium" since the distance D'10 is smaller than the distance D'20, and selects the "Mincho-light" for the typeface. The control section 2 substitutes the "Mincho-medium" for the "Mincho-light", and controls the character output process.

In the above-mentioned embodiment, the technical idea of the present invention is applied to the Chinese character "同", but is applicable to any other characters. The quantitative typeface properties and the qualitative typeface properties may be substituted by any other means which is able to express a distance in a typeface design in a manner that characters distinctively exhibiting the differences of the features of the typefaces are selected, the properties of the selected characters are expressed in terms of property values, and the property values are properly weighted.

Additionally, the resemblance between the typefaces may be judged upon the results of calculating a distance between the typefaces using only the qualitative typeface properties.

As described above, in the invention, when the character output device selects a font with a desired typeface from among a plural number of fonts with difference typefaces in response to a font-use request, and outputs a character using the selected font, the storage section stored quantitative information of the specific parts of specific characters, which is information indicative of features of fonts, in the form of typeface property information in connection with the fonts, the font selector section selects a font with a typeface the use of which is requested when the font is coincident with any of the plural number of the fonts, and a font of which the typeface property information stored in the storage section is closest to that of the use requested font when the use requested font is not included, and the output section outputs a character on the basis of the font selected by the font selector section.

What is claimed is:

1. A character output device which selects a font with a desired typeface from among a plural number of fonts with different typefaces in response to a font-use request, and outputs a character using the selected font, comprising:

storage means for storing quantitative information of specific parts of specific characters, which is information indicative of features of fonts, in the form of typeface property information in connection with the fonts;

font select means for selecting a font with a typeface the use of which is requested when the font is coincident with any of the plural number of fonts, and a font of which the typeface property information stored in said storage means is closest to that of the use requested font when the use requested font is not included in the plural number of fonts; and character output means for outputting a character on the basis of the font selected by said font select means.

2. The character output device according to claim 1, wherein said storage means stores, as the typeface property information, quantitative values obtained by measuring the same parts of characters that are commonly possessed b the plural number of fonts, and qualitative information of the same parts of the characters that are commonly possessed by the plural number of fonts.

3. The character output device according to claim 2, wherein the quantitative values are values obtained by measuring a character width, a vertical line width, a horizontal line width and a counter of the common characters.

4. The character output device according to claim 2, wherein the qualitative information is representative of presence or absence of a putting-of-brush, a serif and a sweep-up at the same parts of the common characters.

5. The character output device according to claim 1, further comprising distance calculating means for calculating a distance between the typeface property of the use requested font and any of other fonts than the use requested font, wherein said font select means selects a font when the use requested font is not included in the plural number of fonts, on the basis of results calculate by said distance calculating means.

* * * * *

UNITED STATES PATENT AND TRADEMARK OFFICE
CERTIFICATE OF CORRECTION

PATENT NO. : 5,668,935
DATED : September 16, 1997
INVENTOR(S) : Osamu ENDO

It is certified that error appears in the above-indentified patent and that said Letters Patent is hereby corrected as shown below:

Claim 2, column 8, line 40, "b" should read --by--.

Claim 5, column 8, line 58, "calculate" should read --calculated--.

Signed and Sealed this

Third Day of February, 1998

BRUCE LEHMAN

Attest:

Attesting Officer

Commissioner of Patents and Trademarks